United States Patent [19]
Grenell

[11] 4,271,554
[45] Jun. 9, 1981

[54] COMBINATION DRILL AND TAP TOOL

[75] Inventor: David Grenell, Laurelton, N.Y.

[73] Assignee: Allen-Stevens Corp., Woodside, N.Y.

[21] Appl. No.: 2,221

[22] Filed: Jan. 9, 1979

[51] Int. Cl.³ .............................................. B23G 5/06
[52] U.S. Cl. .................................... 10/152 T; 10/140;
411/387; 408/26; 408/220
[58] Field of Search ................. 408/26, 118, 215, 219, 408/220, 230; 10/1 B, 140, 152 R, 152 T; 85/47

[56] References Cited

U.S. PATENT DOCUMENTS

| | | | |
|---|---|---|---|
| 2,654,284 | 10/1953 | Schevenell | 85/47 |
| 2,684,492 | 7/1954 | Miner et al. | 408/219 |
| 2,705,419 | 3/1955 | Barth | 10/152 T |
| 3,258,797 | 7/1966 | Budd | 10/152 T |
| 3,429,171 | 2/1969 | Feher | 72/377 X |
| 3,507,183 | 4/1970 | Thurston | 85/47 |

FOREIGN PATENT DOCUMENTS 54777 3/1968 Poland ..................................... 408/215

*Primary Examiner*—Z. R. Bilinsky
*Attorney, Agent, or Firm*—Kirschstein, Kirschstein, Ottinger & Cobrin

[57] ABSTRACT

An elongated rectilinear tool for formation of a threaded hole in ductile metal by the coining or flowing of the metal. The tool typically is employed to form through threaded holes in a piece of ductile metal, and features a working end having a boring tip or drill point and a spade section having a flat shank with grooves in its lateral edges. The spade section holds the drill point and extends back a short distance from the working end. The diameter of the tool then enlarges slightly at a small inclined section which is followed by a longer coining tap section. The coining of metal forms a thread on the previously smooth wall of the drilled hole, with peaks or crests, and roots. The lateral grooving of the spade section tracks, i.e. fits, into the fully formed threading as the present tool is screwed out. If the lateral grooves or notches for the spade section were not provided, then during removal of the tool from the threaded hole, the spade section of the drill portion would shear away the crests of the threads.

5 Claims, 13 Drawing Figures

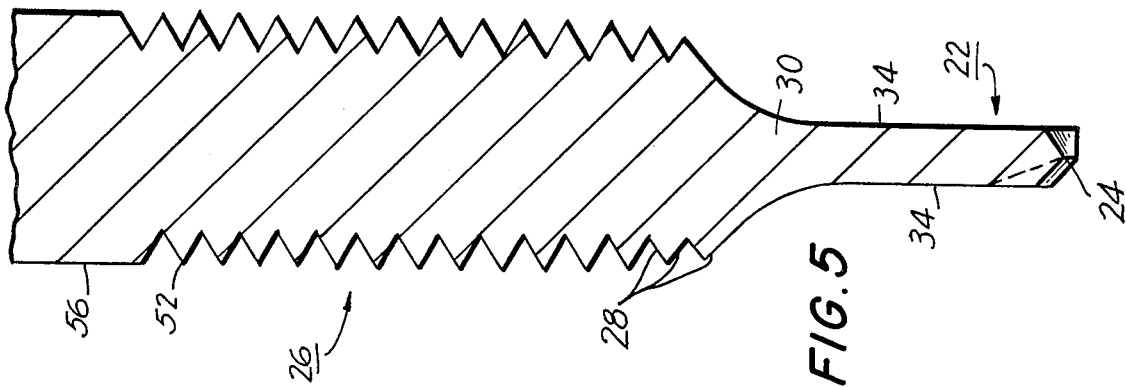
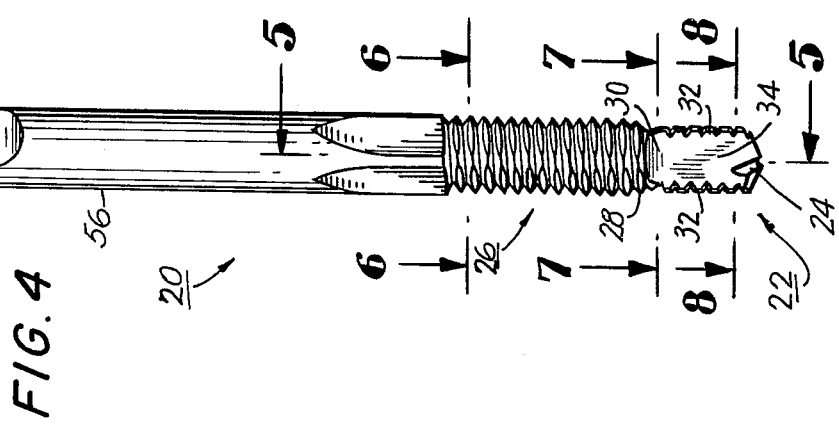
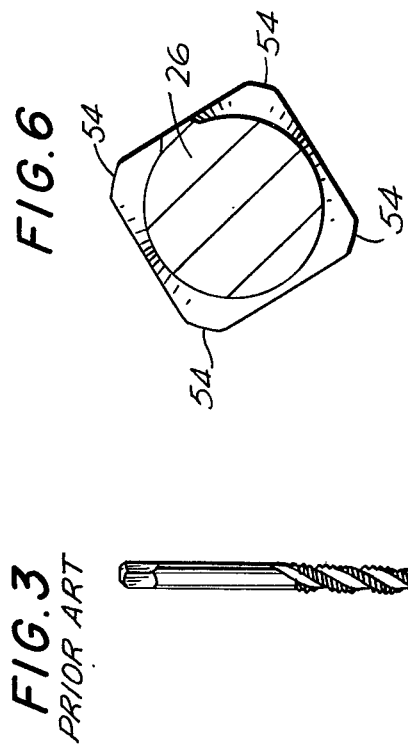

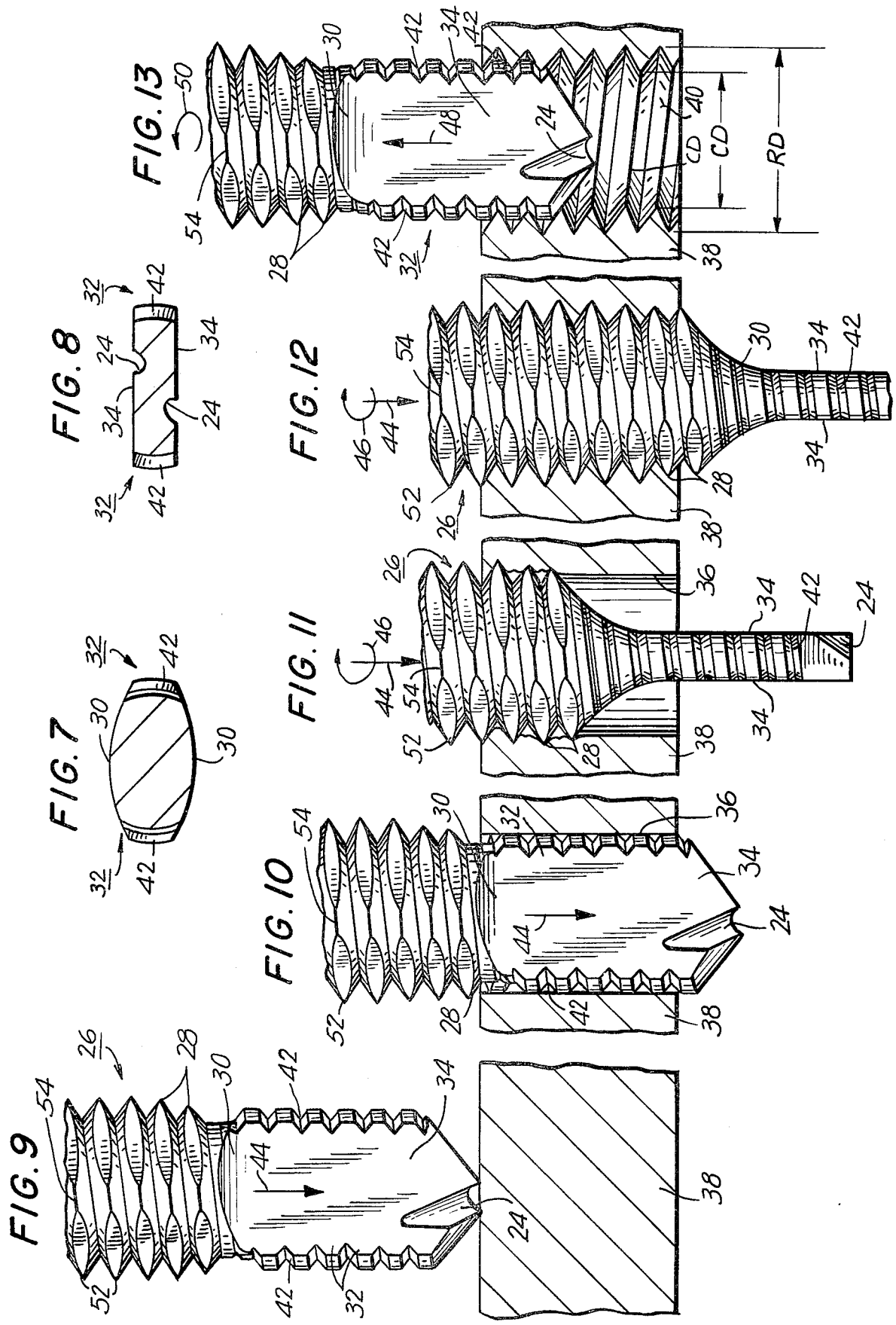

COMBINATION DRILL AND TAP TOOL

BACKGROUND OF THE INVENTION

1. Field of the Invention

A tool for forming a threaded hole in a plastically deformable metal.

2. Description of the Prior Art

A drill bit of the prior art is a well-known rectilinear tool having a cutting tip to initially penetrate into a solid body. The shanks of the bits extend back from the cutting tips. There are two major types of bits, namely, a spade bit and a twist bit. In a twist bit the shank is provided with spiral or helical grooves having peripheral cutting edges. The bit generally is cylindrical. In a spade bit the shank usually is rectangular and approximately flat. The back end of the bit is inserted into the chuck of a suitable means to impart rotary motion about the central longitudinal axis to the bit. Thus, the bit, when mounted in the chuck of a drill press, hand-operated drill, etc., or when mounted in any suitable means to concomitantly impart rotary motion and to exert inward cutting force against a solid body, serves to cut and drill a smooth-walled cylindrical hole into the solid body. The diameter of the hole is, of course, equal to the diameter of the shank of the bit.

A cutting tap of the prior art is a tool which is inserted (by axial rotation and axial force) into a previously drilled smooth-walled generally cylindrical hole in metal. A cutting tap is a rectilinear generally cylindrical tool. However, the function of a cutting tap is vastly different from that of a drill. The cutting tap has annular spaced cutting teeth along its shank, arrayed in rows which extend longitudinally in parallel along the perimetral surface of the tool. The rows of teeth are separated by grooves. The mode of using a cutting tap is similar to that employed in using a drill, except that the minimum diameter of the cutting tap is of slightly greater diameter than that of the pre-existing hole and, as it is manually forced downward into the hole, by a combination of downward force and twisting (rotary motion about its longitudinal axis), the tap cuts metal from the wall of the hole and makes a spiral thread in the wall of the hole.

A coining tap, as its name implies, coins a screw thread in a pre-existing hole. Its minimum diameter is smaller than that of the pre-existing hole.

An existing "drap", namely a combined drill and tap, drills and cuts a thread, and does not coin or form a thread.

Pertinent prior art relative to bits and taps includes U.S. Pat. Nos. 3,195,156 and 3,812,698.

SUMMARY OF THE INVENTION

1. Purposes of the Invention

It is an object of the present invention to provide a combination drill and coining tap tool.

Another object is to provide a combination drill and coining tap tool for drilling a hole into a plastically deformable metal work piece and, without removing the tool from the hole, coinging a helical thread from the metal adjacent the interior surface of the hole.

A further object is to provide a single tool which performs the combined functions of two prior art tools in a new manner.

An additional object is to form a threaded hole in a solid metal body in a new manner using a new combination drill and coining tap tool.

Still another object is to provide a method of forming a threaded hole in a surface of a plastically deformable metal work piece in a single operation by first drilling a hole in the work piece and then coin-tapping the hole with a single tool without removing the tool from the hole prior to coin-tapping.

Still a further object is to provide a combination drill and coining tap tool which causes a small diameter cylindrical hole first to be drilled and then the surface of the hole to be coin-threaded with a coining tap which is larger than the drill, the drill portion having notches or the like which enable the drill to be withdrawn from the hole, after coin-tapping the same, without cutting off the female threads that have been formed.

Still an additional object is to provide a tool for forming a threaded hole in ductile metals and hard metals.

An object is to provide a combination drill and coining tap tool in which notches in the drill lands track the thread that has been formed by the coining tap, so that when the tool is screwed out the drill portion will not cut off the formed thread.

An object is to provide a combination drill and tap tool which can be used with power tools such as a drill press, or with manually-operated tools.

An object is to provide a tool which accomplishes the formation of a threaded hole in a work piece in a one-step operation.

These and other objects and advantages of the present invention will become evident from the description which follows.

2. Brief Description of the Invention

In the present invention, the new combination drill and coining tap tool has a boring tip (drill point) for initial penetration into metal to make a smooth-walled hole. The tool primarily is intended to work on ductile metals such as brass, zinc, zinc-aluminum alloy, copper, wrought iron, soft aluminum, etc.

The boring tip is followed by a spade section constituting a flat shank having grooves or notches in its lateral edges. The grooves or notches have a certain center-to-center spacing, shape, position and size. The flat shank supports the central boring tip, reams the cut hole, and provides space to accommodate shavings as the boring tip moves into the metal and cuts a smooth-walled hole.

A short small-diameter section at the rear of the flat shank integrally connects the shank to a coining tap section. The coining tap section has a front lead-in segment that does most of the coining (flowing) of metal to form a thread on the previously-smooth wall of the hole. The remainder of the coining tap section perfects the thread and holds the lead-in segment in place as the thread is coined. Thus, the spiral thread is formed by flowing, i.e. coining, of plastically deformable metal, instead of cutting metal away from the surface of the smooth-walled hole. The present coining tap section does not cut metal away from the body of the metal, but, instead, coins and deforms the metal by flowing the metal so as to form the desired thread. The coining tap section does not shear any metal off and away from the body of the metal; instead, the coining tap section merely displaces and deforms, i.e. coins, the metal, so as to form the desired thread.

The coined female crest diameter of the formed thread is smaller than the original smooth-walled drilled hole diameter because of the raising of the crests. The female root diameter of the formed thread is larger than the original smooth-walled drilled hole diameter because of the coining of metal away from the smooth wall.

In a preferred embodiment of the invention, the coining tap section has a coining thread with a plurality of longitudinal sections which are slightly flattened. In this case, when the tool is used, basically only the corners of the thread on the coining tap section do the work; the balance (flat portions) of the coining tap section basically are to admit lubrication and also possibly to accommodate any particles that may be dislodged.

It is important to note that the tool is removed from the completed threaded hole by unscrewing, i.e. first the coining tap section and then the drill portion (the shank section) are screwed out. The grooves or notches in the edges of the flat shank are so spaced, shaped and dimensioned as to track, i.e. fit over, the fully formed coin thread as the tool is screwed out. If the grooves or notches were not provided or properly spaced, shaped, positioned or sized, during removal of the tool from the threaded hole, the flat shank section of the drill portion would shear away the crests of the coin-formed thread, since, as mentioned supra, the crests of the coined thread extend inwardly from the previous diameter of the smooth-walled drilled hole to a smaller diameter.

The tool is completed by the provision of a terminal drive end to accommodate the insertion and mounting of the combination tool on an appropriate means for holding the tool so that it may be concomitantly rotated and moved against a surface of a solid metal body of plastically deformable metal. Typically, a means for holding the present tool is the jaws of a drill chuck of a drill press, a manually-operated drill or the like. The jaws of the chuck converge on the terminal end of the tool and clamp the tool in position, ready for use, in a manner well understood by those skilled in the art.

In summary, the present combination drill and coining tap tool is configured for drilling a hole into a plastically deformable metal work piece and, without removing the tool from the hole, coining a helical thread from the metal adjacent the interior surface of the hole. The tool basically includes an elongated rectilinear body having a leading metal drill portion with a boring tip, and a coining tap portion integral with and operatively following the drill portion. The coining tap portion has a lead-in end connected to the end of the drill portion remote from the boring tip. The drill portion includes interior chasing lands separated by circumferentially intermediate portions to accommodate drilled-out metal. The boring tip is adapted to drill a hole of a predetermined diameter in the work piece. The diameters of the lands generally are equal to that of the hole, and the diameters of the intermediate portions are less than that of the hole. The coining tap portion is constructed to form a female thread by cold flow of the metal adjacent the surface of the drilled hole without removing the tool from the hole. This female thread has a predetermined root diameter greater than the predetermined diameter of the hole, and a predetermined crest diameter less than the predetermined diameter of the hole, and a predetermined pitch. Finally, and most importantly, the lands have grooves or notches so relatively spaced, positioned, dimensioned and shaped as to track the coined female thread and clear the crest thereof when the tool is unscrewed to retract the tool from the drilled and tapped hole.

The center-to-center spacing between adjacent grooves or notches in the drill portion is equal to the pitch of the coined female thread. In a preferred embodiment, the grooves or notches and the crest of the tapped thread lie on a common uniform helix.

Typically, the drill portion is a spade drill, although a twist drill is within the ambit of the invention.

The present invention also contemplates a method of forming a threaded hole in a surface of a plastically deformable metal work piece in a single operation, first by drilling a hole in the work piece, and then coin-tapping the hole with a single tool, without removing the tool from the hole prior to coin-tapping. The method entails drilling and tapping into a surface of the work piece with a combination drill and coining tap tool which includes an elongated rectilinear body having a leading metal drill portion with a boring tip, and a coining tap portion integral with and operatively following the drill portion. The coining tap portion has a lead-in end connected to the end of the drill portion remote from the boring tip. The drill portion includes interior chasing lands separated by circumferentially intermediate portions. The boring tip is adapted to drill a hole of a predetermined diameter in the work piece. The diameters of the lands generally are equal to that of the hole, and the diameters of the intermediate portions are less than that of the hole. The coining tap portion is adapted to form a female thread by cold flow of the metal adjacent the surface of the drilled hole. The female thread has a predetermined root diameter greater than the predetermined diameter of the hole, and a predetermined crest diameter less than the predetermined diameter of the hole, and a predetermined pitch. The lands have grooves or notches so relatively spaced, positioned, dimensioned and shaped as to track the coined female thread and clear the crest thereof when the tool is unscrewed to retract it from a drilled and tapped hole.

Although the metal of the work piece preferably is a ductile metal such as brass, zinc, zinc-aluminum alloy, aluminum, copper or wrought iron, the tool of the present invention also could be used on steel such as cold rolled steel, if the material of the tool is tough enough, if the tool is supplied with a coolant, if the power driving the tool is sufficient, and if the tool is not driven too rapidly so as to overheat the tool or the work piece.

The present invention is directed to a combination drill and coining tap tool in which the configuration of the various parts of the tool causes, first, a small hole to be drilled, and then the hole is coin-threaded with a coin tap which is larger than the hole, and then added to this is the provision of the grooves or notches which enable the drill to be withdrawn from the hole, after coin tapping the same, without cutting off the female threads that have been formed.

The invention accordingly consists in the features of construction, combination of elements, arrangement of parts and series of steps which will be exemplified in the method and article of manufacture hereinafter described and of which the scope of application will be indicated in the appended claims.

BRIEF DESCRIPTION OF THE DRAWINGS

In the accompanying drawings, in which is shown one of the various possible embodiments of the invention:

FIGS. 1, 2 and 3 are elevation views showing prior art tap configurations;

FIG. 4 is an elevation view of the present combination drill and coin tap tool;

FIG. 5 is a sectional elevation view taken substantially along the line 5—5 of FIG. 4;

FIG. 6 is a sectional plan view taken substantially along the line 6—6 of FIG. 4;

FIG. 7 is a sectional plan view taken substantially along the line 7—7 of FIG. 4;

FIG. 8 is a sectional plan view taken substantially along the line 8—8 of FIG. 4;

FIG. 9 is an elevation view showing the present tool in position and ready to form a through threaded hole in a work piece;

FIG. 10 shows the progress of the tool of FIG. 9 to the point where a smooth-walled hole has been drilled through the work piece by the drill portion of the tool;

FIG. 11 shows the subsequent entry of the coin tap section of the tool into the smooth-walled hole of FIG. 10, with threads being formed by the coining of metal from the wall of the hole;

FIG. 12 shows the completed formation of an entirely threaded hole by the downward progression of the tool to a bottom point relative to the work piece; and FIG. 13 shows the subsequent withdrawal of the drill section upwards through the now-threaded hole, with notches in the drill lands tracking the thread of the hole.

DETAILED DESCRIPTION OF THE PREFERRED EMBODIMENTS

Referring now to FIGS. 1, 2 and 3, three types of prior art tap configurations are shown. These prior art taps are claimed to be chip handler taps; chips are a problem in practice because they can damage threads and are costly to remove. FIG. 1 shows a thread forming tap which is V-grooved to permit a lubricant to enter freely and aid in the thread-forming process. This tap is said to be useful for ductile materials and produces a thread with clean flanks; it is claimed that the threads are formed rather than being cut, and no chips are produced. Such a tap is available in plug and bottoming styles. FIG. 2 shows a chip-shooter or "gun" tap which is designed to shoot chips forward in taping through holes. It is postulated that, in this way, no chip interference occurs in backing out the tap. Such taps are also used in blind holes where sufficient chip space is available. Typically, such taps are designed in three styles—regular, high hook and heavy duty—and these prior art taps usually are surface treated in manufacture. FIG. 3 shows a chip-lifter tap; this is a spiral fluted tap which may draw chips out of the hole. This can eliminate the chip cleaning operation in many cases. These taps, it is claimed, also bridge keyways and other gaps. This tap is typically applied to aluminum, magnesium, brass, copper and other die-cast metals, particularly in blind holes. Such tap is designed in slow and fast spiral and heavy-duty styles.

Referring now to FIGS. 4-8 inclusive, the present combination drill and tap tool for drilling a hole into a plastically deformable metal work piece and, without removing the tool from the hole, coining a helical thread from the metal adjacent the interior surface of the hole, is shown. The present combination drill and tap tool basically includes an elongated rectilinear body 20 having a leading metal drill portion 22 with a boring tip 24 and a coining tap portion 26 integral with and operatively following the drill portion 22. The coining tap portion 26 has a lead-in end 28 of tapered and diminishing diameter connected to the end 30 of the drill portion 22 remote from the boring tip 24. The transition section 28 between the tap part 26 of the tool 20, and the drill portion 22, actually is a part of the end portion. It is what is known as a "lead-in" end and starts the formation (coining) of the thread. As is understood by those skilled in the art, a thread cannot be abruptly coined. The coining has to start slowly and gradually proceeed until the full thread is coined. The leading end 28 starts the coining. The lead-in usually is from 2 to 2½ threads long and it is a tapered part of the coining tap portion 26. The drill portion 22 includes interior chasing lands 32 separated by circumferentially intermediate portions 34.

The boring tip 24 is adapted to drill a smooth-walled hole 36 of a predetermined diameter in a work piece 38 as shown in FIGS. 9, 10 and 11. The FIGS. 9-13 inclusive show the successive stages of formation of a threaded hole 40 in the work piece 38. The diameters of the lands 32 are substantially equal to that of the hole 36, and the diameters of the intermediate portions 34 are less than that of the hole 36. As shown in FIGS. 11 and 12, the coining tap portion 26, and especially the lead-in end 28, is constructed to form a female thread by the cold flow of metal (FIGS. 11 and 12) adjacent the surface of the drilled hole 36 without removing the tool 20 from the hole 36. The finished female thread as formed by flowing and coining of metal, and as seen in FIG. 13, has a predetermined root diameter RD greater than the predetermined diameter of the hole 36, a predetermined crest diameter CD less than the predetermined diameter of the hole, and a predetermined pitch.

As best seen in FIGS. 9, 10 and 13, and especially in FIG. 13, the lands 32 have notches 42 so relatively spaced, positioned, dimensioned and shaped as to track the coined female thread 40 and clear the crest CD thereof when the tool 20 is unscrewed (FIG. 13) to retract it from the drilled (36) and subsequently tapped (40) hole. The arrows 44 in FIGS. 9-12 indicate the downward progression of the tool 20 into the work piece 38 as it is rotated as indicated by arrows 46 and concomitantly pressed against the work piece 38; the arrow 48 (FIG. 13) indicates the upward progression of the tool 20 as it is unscrewed and retracted from the threaded hole 40 as indicated by arrow 50.

In this preferred embodiment of the invention, the threading 52 of the coining tap section 26 includes four flattened longitudinal sections, so that only the corners 54 of the threading 52 of the coining tap section 26, and only the tapered section 28 in particular, coin the interior surface of the hole 36 to form the threading 40. The tool is completed by the provision of a shank 56 (FIG. 4) leading to the opposite end fitting 58 to accommodate the chuck of a drill press or the like, not shown.

The center-to-center space between adjacent notches in the drill portion is equal to the pitch of the coined female thread, and in a preferred embodiment the notches and the crest of the coining thread lie on a common uniform helix. Typically as shown, the drill portion is a spade drill; and preferably the spade drill includes the opposite generally parallel flattened faces 34.

Numerous alternatives within the scope of the present invention will occur to those skilled in the art. Thus, since a spade drill in most instances would not be useful for drilling cold rolled steel, an alternative within the scope of the invention would be to provide a twist drill, which likewise would be provided with clearance notches in its lands for withdrawal of the tool from the tapped hole without shearing off the coined thread. In any case, the notches in the drill lands must track the thread that has been formed by the coining tap, so that when the tool is screwed out, the drill portion will not cut off the formed thread. In a preferred embodiment, and in most instances, the notches and the threading portions of the coining section lie on a common helix or thread, as mentioned supra.

The present combination drill and tap tool is primarily intended to be used with a power tool such as a drill press. Thus the tool will be power driven during drilling and will be power driven during tapping. If the power tool is sufficiently strong and lubricants are used, and if the present tool is not rotated too rapidly, the speed of rotation of the tool would not have to be changed after finishing the drilling and starting coining. In the preferred embodiment, however, the drilling will proceed more rapidly, i.e., the tool will turn faster when it is drilling than when it is tapping. Thus, the power tool will have its speed of rotation reduced after the drilling and before coining starts.

Albeit the present tool is primarily intended to be used for industrial purposes in factories, machine shops, and the like, home use of the tool is also contemplated.

The principal intended use of the tool is for drilling and tapping through holes, since as shown, the tool will not discharge chips to the entry end of the hole being drilled. However, it could be used for a blind hole if the tapping portion is designed to permit exit of chips through the entry end, as, for example, in the prior art FIG. 3 configuration discussed supra.

It should be mentioned that a spacing could be provided between the coining tap portion and the drill portion, e.g. a rod-like connection section. If the spacing is greater than the length of the threaded hole, the grooves or notches in the drill section and the threading portion of the coining tap section would not have to lie on a common helix or thread, since an adjustment of the relative longitudinal displacement of these parts of the tool could be made immediately prior to the unscrewing of the drill portion of the tool out of the threaded hole. Such adjustment would be made properly to thread the grooves or notches of the drill section into the formed threads of the threaded hole. This modification is not preferred.

It thus will be seen that there is provided a combination drill and tap tool and method which achieves the various objects of the invention and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense. This, it will be understood by those skilled in the art that although preferred and alternative embodiments have been shown and described in accordance with the Patent Statutes, the invention is not limited thereto or thereby.

Having thus described the invention, there is claimed as new and desired to be secured by Letters Patent:

1. A combination drill and tap tool for drilling a hole into a plastically deformable metal work piece and, without removing the tool from the hole, coining a helical thread from the metal adjacent the interior surface of the hole, said tool comprising:

an elongated rectilinear body having a leading metal drill portion with a boring tip and a coining tap portion integral with and operatively following said drill portion, said coining tap portion having a lead-in end connected to the end of the drill portion remote from the boring tip, said drill portion including two opposed interior chasing lands separated by circumferentially intermediate portions, said boring tip being adapted to drill a hole of a predetermined diameter, the diameters of said opposed lands being substantially equal to that of said hole and the diameters of said intermediate portions being less than that of said hole, said coining tap portion being constructed to form a female thread by cold flow of the metal adjacent the surface of said drilled hole without removing the tool from the hole, said female thread having a predetermined root diameter greater than said predetermined diameter of said hole, a predetermined crest diameter less than said predetermined diameter of said hole, and a predetermined pitch, each of said opposed lands having notches so relatively spaced, positioned, dimensioned and shaped that both of said lands track the entire coined female thread and clear the crest thereof when the tool is unscrewed to completely retract the same from a drilled and tapped hole.

2. A tool as set forth in claim 1 wherein the center-to-center space between adjacent notches in the drill portion is equal to the pitch of the coined female thread.

3. A tool as set forth in claim 2 wherein the notches and the crest of the tapped thread lie on a common uniform helix.

4. A tool as set forth in claim 1 wherein the drill portion is a spade drill.

5. A tool as set forth in claim 4 wherein the spade drill includes opposite substantially parallel flattened faces.

* * * * *